United States Patent [19]

Mann

[11] 4,281,451
[45] Aug. 4, 1981

[54] ELECTRIC HEATER -METHOD OF MAKING

[75] Inventor: Gamdur S. Mann, Flint, Mich.

[73] Assignee: General Motors Corporation, Detroit, Mich.

[21] Appl. No.: 56,999

[22] Filed: Jul. 12, 1979

Related U.S. Application Data

[62] Division of Ser. No. 876,693, Feb. 10, 1978, abandoned.

[51] Int. Cl.³ .............................................. H05B 3/00
[52] U.S. Cl. ....................................... 29/611; 29/613;
29/615; 123/145 A
[58] Field of Search .............. 29/611, 613, 615, 25.12;
123/145 R, 145 A; 338/273, 226; 219/200, 205, 209

[56] References Cited

U.S. PATENT DOCUMENTS

| 3,221,203 | 11/1965 | Ragland | 313/271 |
| 4,112,577 | 9/1978 | Mann | 29/611 |

Primary Examiner—Leon Gilden
Attorney, Agent, or Firm—Robert J. Outland

[57] ABSTRACT

A sheathed electric heater for use as an engine glow plug or the like is formed by providing a closed end metal sheath, installing a centered electric heating element that approaches the sheath closed end, adding a small amount of sinterable metal powder covering the end of the heating element at the closed end of the sheath, filling the remaining volume around the element with granular electrical insulating material, swaging the assembly to reduce its diameter, extend its length and compact the insulation, and sintering the metal powder by passing electric current therethrough to provide a low resistance electrical connection between the heating coil and the closed end of the sheath.

2 Claims, 5 Drawing Figures

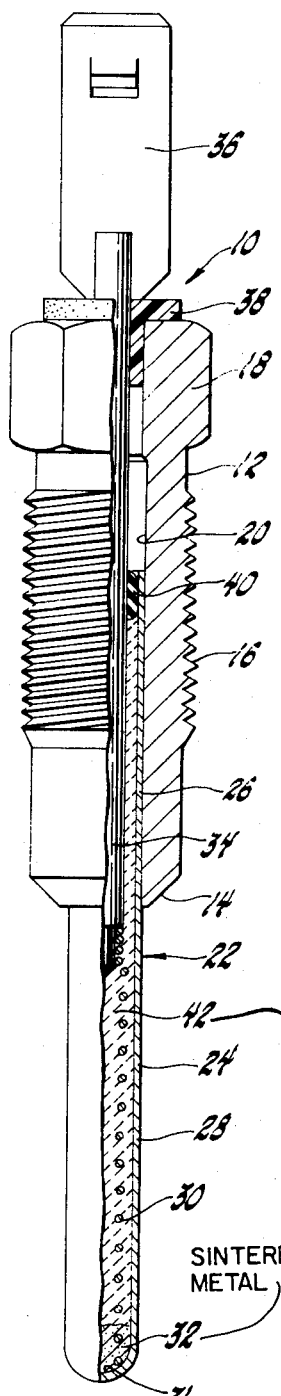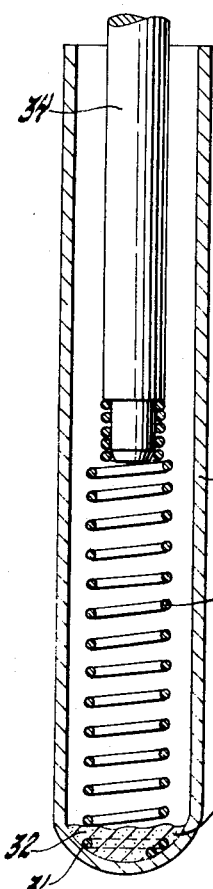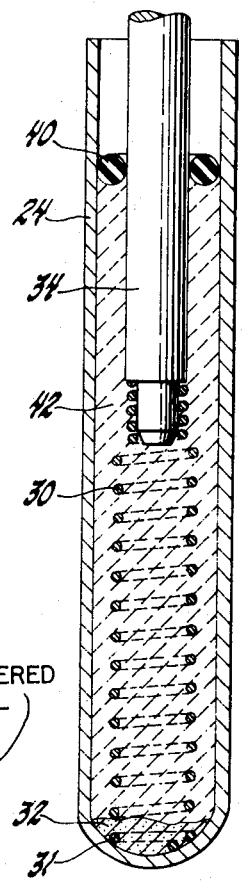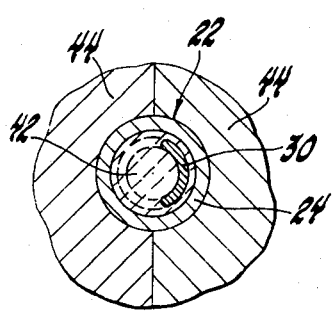

ELECTRIC HEATER -METHOD OF MAKING

CROSS REFERENCE TO RELATED APPLICATION

This is a division of application Ser. No. 876,693 filed Feb. 10, 1978 and now abandoned.

BACKGROUND OF THE INVENTION

This invention relates to electric heaters and their manufacture and more particularly to tubular heaters of a type usable as engine glow plugs or for other localized heating applications and having a conductive tubular sheath surrounding an electrical heating coil.

It is known in the electric heater art to provide heaters for use as engine glow plugs and the like which have a closed end tubular protective metal sheath surrounding an axially extending heating element. The element is electrically connected with the closed end of the sheath and also connects with an electrode extending from the sheath open end. The remainder of the sheath interior is packed with a suitable electrical insulating material such as magnesium oxide (MgO).

A prior method of manufacturing such heaters has included a step of hot welding the end of the coiled heating element to the closed end of the sheath in order to provide a satisfactory electrical connection between the heating element and the sheath. Even though this welding is carefully done, localized metallurgical changes may result in resistance variations and susceptibility to cracking during a subsequent swaging operation. This may affect the usability of the resulting part. Another problem of such heaters in service is caused by internal oxidation of heating element, possibly due to oxygen generated from the moisture content of the magnesium oxide of from other external sources. Such oxidation may result in excessive localized heating and the eventual breakdown of the heating element.

SUMMARY OF THE INVENTION

The present invention provides an improved heater construction and method of manufacture which reduces the above mentioned problems. This is accomplished in part by eliminating the welding step and utilizing instead a small amount of metal powder which is placed in the closed end of the sheath, in contact with the end of the heating element, and sintered to provide a low resistance electrical connection between the sheath and the element. The sintering step may be accomplished by passing an electrical current through the powder between the heating element and the sheath to accomplish the sintering step without raising the temperatures of the heating element and sheath to a level causing metallurgical changes in their structures.

In another optional feature of the invention, the portion of the heating element not forming the electrical connection may be preoxidized by heating the element in an oxygen containing atmosphere before assembly so as to provide a sound oxide layer that protects the element from further oxidation in use after assembly.

These and other features of the invention will be more fully understood from the following description of a preferred embodiment and method of manufacture taken together with the accompanying drawing.

BRIEF DESCRIPTION OF THE DRAWING

In the drawing:

FIG. 1 is a side elevational view of a diesel engine glow plug formed according to the invention and having portions broken away to show the interior construction;

FIG. 2 is a longitudinal cross-sectional view of a sheath and heater in a partial stage assembly;

FIG. 3 is a longitudinal cross-sectional view of a sheath and heater assembly before swaging;

FIG. 4 is a longitudinal cross-sectional view showing the heater assembly in the swaging dies at the conclusion of the swaging step; and FIG. 5 is a transverse cross-sectional view taken in the plane indicated by the line 5—5 of FIG. 4 and further illustrating the swaging dies and heater assembly.

BRIEF DESCRIPTION OF THE ILLUSTRATED EMBODIMENT

In the drawing, numeral 10 generally indicates a diesel engine glow plug having the features of and made in accordance with the method of this invention.

Glow plug 10 includes a conventional metal outer shell 12 having a conical sealing surface 14 at one end, a threaded portion 16 intermediate the ends and a hexagonal head 18 at the end opposite the sealing surface. The shell includes a longitudinal bore 20 in the lower portion of which there is press-fitted a sheathed heater assembly generally indicated by numeral 22.

Heater assembly 22 includes a tubular metal sheath 24 having an upper open end portion 26 fixed within the bore 20 and an elongated closed end portion 28 extending outwardly of the shell along the axis of the bore 20.

Centered within the sheath is a longitudinally extending electrical resistance heating coil or element 30, one end 31 of which engages the closed end of the sheath. At this end, the sheath and heating coil are mechanically and electrically joined by a small amount of sintered metal 32 which is emplaced in accordance with the invention in a manner to be subsequently described.

The heating coil extends from the closed end of the tubular sheath up to about its center, at which point it is attached, preferably by flash welding, to the end of a center rod or terminal 34. The terminal extends out through the open end of the sheath 24 and through the bore 20 to extend outwardly of the hex headed end of the shell 12. A terminal blade 36 is affixed to the exposed end of the center terminal to receive an electrical attaching clip. The terminal 34 is centered within and insulated from the shell 12 and sheath 24 by a phenolic insulator 38 between the terminal and shell and a compressed rubber o-ring 40 between the terminal and the open end of the sheath. The remaining space within the sheath is filled with a suitable electrical insulating material 42 such as compressed granulated magnesium oxide which holds the heating coil and terminal in their centered positions within the sheath and prevents electrical contact between them, except at the intentionally joined points at the closed end of the sheath.

The construction is such that upon installation of the glow plug in an engine with appropriate electrical connections, a current may be passed from the blade 36 through the terminal and heating coil to the closed end of the sheath, and therethrough back to the shell which is grounded to the engine, causing the heating coil to raise to operating temperature the exposed end of the sheathed heater assembly.

A preferred method of making an electric heater of the type used in the glow plug illustrated in FIG. 1 is as follows.

First, the closed end tubular sheath 24 is formed with a diameter about 30 percent larger and a length about 30 percent shorter than desired finished dimensions. The wire heating coil 30 is then wound and attached by flash welding to one end of the center terminal 34 to form a terminal and coil assembly. This assembly is then inserted into the open end of the sheath 24 and centered therein with the lower end of the heating coil engaging the inner surface of the closed end of the sheath. A small amount of the sinterable metal 32 is then poured into the sheath, covering the lower portion of the heating coil at its points of engagement with the sheath. FIG. 2 illustrates the partially complete heater at this stage in the assembly process.

Subsequently, the open areas within the tube at the locations of the heating coil and part way up the center terminal are filled with the insulating material 42, which is preferably granulated magnesium oxide. The loose material is retained in place by the placement of the o-ring 40 in the annular space between the terminal 34 and sheath 24, spaced slightly inward from the open upper end of the sheath, as shown in FIG. 3.

Thereafter, the assembly is swaged to reduce its diameter and extend its length. Preferably, the swaging operation is done in multiple steps, with the open end of the sheath being swaged first in order to compress the o-ring 40 and positively prevent the escape of any of the insulating material 42. The assembly is then swaged from its closed end until the whole length of the assembly has been reduced and extended to the final dimensions of the heater assembly 22. FIGS. 4 and 5 illustrate the assembly after swaging while still within the swaging dies 44.

To form a glow plug as shown in FIG. 1, the sheathed heater assembly 22 is pressed into the shell 12 and the phenolic insulator 38 and terminal blade 36 are attached. At this point, or immediately after the swaging step, the sinterable metal 32 is sintered into a solid mass by passing an electric current through the heater assembly. The current is preferably controlled at about the same level as the normal current rating of the heater in operation. The high resistance of the metal powder in its unsintered form raises its temperature to a point where the particles adhere together in a more solidified mass, providing a low resistance electric contact between the end of the sheath 24 and the heater coil 30.

The various elements of the heater assembly and the glow plug may be made from any of the known materials capable of accomplishing the desired purpose. In one version of the illustrated embodiment, the sheath is formed of a high temperature corrosion resistant nickel alloy of the Inconel type, while the center terminal and heating coil are made of high nickel alloys and the sinterable metal is nickel powder.

In an optional step in the method of assembly, the heating element may be preoxidized, preferably after attachment to the center terminal, by heating the element to about 2,000° F. in air for a period of from 15 minutes to two hours so that an insulating layer of oxide is formed on the surface of the wire. The electrical connection should be made in such a way that the very end turn of the heater coil, which engages the inner end of the sheath upon assembly, is not heated. This end turn then remains free of the oxide coating and is capable of making a low resistance electrical connection with the sheath through the sintered metal 32.

Glow plugs and other sheathed heater devices made in accordance with the invention as described have the advantage that welding of the heater coil to the sheath is replaced by the sintering of metal powder to provide the electrical contact. This process is accomplished at much lower temperatures than the usual welding process and thus avoids undesirable metallurgical changes at the tip of the sheath and heating coil. Further, the optional preoxidizing of the heater coil protects the coil from subsequent oxidation in service and thus helps provide a longer lasting assembly.

It should be understood that sheathed heater assemblies of the type described herein may be utilized for applications other than engine glow plugs. One such application presently contemplated for such a sheathed heater is to provide heat to exhaust gas sensor devices used in engine exhaust systems and connected with electronic air-fuel ratio controls.

While the invention has been described by reference to a specific embodiment chosen for purposes of illustration, it should be understood that numerous changes could be made in the structure and method of assembly described without departing from the inventive concepts embodied in the foregoing disclosure. Accordingly, it is intended that the invention not be limited to the specific embodiment and method disclosed, but have the full scope permitted by the language of the following claims.

What is claimed is:

1. The method of making an electric heater of the type having an elongated electrically conductive tubular metal sheath closed at one end and containing an axially extending heating coil electrically grounded at one end to the sheath adjacent its closed end and insulated therefrom elsewhere by heat conductive insulation, said method comprising the steps of:
   (a) forming the sheath with a width substantially larger than the desired finished size thereof,
   (b) forming the heating coil with a width dimension smaller than the interior width of the sheath, the coil being attached at one end to an electrical conductor, the other end being free,
   (c) centering the heating coil and conductor in the sheath with the free end adjacent to the sheath closed end, the adjacent surfaces of the sheath interior and the coil free end being free from foreign substances,
   (d) filling the tip portion of the sheath interior with an amount of sinterable metal powder sufficient to cover the free end of the heating coil,
   (e) filling the remaining open interior of the sheath with granular high temperature electrical insulating material tightly packed around and within the heating coil and sealing the open end of the sheath to retain the insulating material in place,
   (f) swaging the heater assembly to reduce the width and extend the length of the sheath and interior heating coil to finished dimensions, and
   (g) passing an electric current between the heating element and sheath through the metal powder to heat and sinter the metal powder in the sheath tip, surrounding the coil free end, whereby a low resistance electrical connection is formed between the sheath and the heating coil through the sintered metal.

2. The method of claim 1 and further including the step of preoxidizing the heating coil, except for the free end thereof, before its assembly with the sheath, said preoxidizing step being conducted by heating the coil to oxidizing temperature in air by passing an electric current therethrough for a predetermined period.

* * * * *